United States Patent [19]

Hampson

[11] Patent Number: 5,416,487
[45] Date of Patent: May 16, 1995

[54] TESTING OF DUAL TECHNOLOGY SENSORS

[75] Inventor: John G. Hampson, High Wycombe, England

[73] Assignee: Scantronic Limited, Greenford, England

[21] Appl. No.: 82,472

[22] Filed: Jun. 28, 1993

[51] Int. Cl.⁶ .............................................. G01S 7/40
[52] U.S. Cl. .................................... 342/53; 342/28; 342/173; 340/554
[58] Field of Search ................ 342/28, 53, 165, 173; 367/94; 340/554

[56] References Cited

U.S. PATENT DOCUMENTS

| | | |
|---|---|---|
| 3,074,053 | 1/1963 | McDonough et al. |
| 3,271,754 | 9/1966 | Corbell .................................. 342/28 |
| 3,703,722 | 11/1972 | Gershberg et al. .................. 342/28 |
| 3,801,978 | 4/1974 | Gershberg et al. |
| 3,873,981 | 3/1975 | Bloice .................................... 342/28 |
| 4,710,750 | 12/1987 | Johnson. |
| 4,833,450 | 5/1989 | Buccola et al. ................... 340/522 X |
| 5,093,656 | 3/1992 | Dipoala .............................. 340/522 |
| 5,150,123 | 9/1992 | Orlowski et al. .................. 342/28 |
| 5,237,330 | 8/1993 | Yaacov et al. ..................... 342/28 |
| 5,287,111 | 2/1994 | Shpater .............................. 342/28 |

Primary Examiner—Gilberto Barrón, Jr.
Attorney, Agent, or Firm—Laubscher & Laubscher

[57] ABSTRACT

The microwave section of a dual technology sensor comprising microwave and infrared sections may be periodically tested. This is done by arranging for the output of the microwave section to be monitored at times corresponding to microwave pulses and at times coresponding to no microwave pulses. If the microwave section is operating properly then a difference should be seen in the output between the "pulse" and "no pulse" times. Because this test can involve a change in the average energy output by the microwave section it can also affect the infrared section of the sensor which often inadvertently receives radiation from the microwave source. Thus the infrared section may be tested using this effect.

13 Claims, 3 Drawing Sheets

TESTING OF DUAL TECHNOLOGY SENSORS

BACKGROUND OF THE INVENTION

1. Field of the Invention

The present invention relates to the field of dual technology sensors. More particularly, the invention concerns dual technology sensors using microwave and infrared sensing elements.

2. Description of the Prior Art

Dual technology sensors are increasingly being used for intruder detection and the like. A particularly popular combination of technologies involves a microwave section and a passive infrared section.

As is well known, in a dual technology sensor an alarm signal will be produced only when both of the constituent technologies detects an intruder. Thus the sensor will be rendered useless if one of the two technologies should become inoperative. It is clearly desirable, then, that the two detectors should periodically or intermittently test themselves and, if a malfunction is detected, generate a fault indication.

It is common for the microwave section of a dual technology sensor to use an oscillator operating in a pulsed mode. The interval between successive pulses of microwave energy is controlled to give the desired power output (and, thus, detection range). Typically, each power pulse includes a large number of cycles of the oscillator output and occupies only a small fraction of the interpulse period. An example of a dual technology sensor of this type is the Twintec 1080 manufactured by Scantronic Limited.

BRIEF SUMMARY OF THE INVENTION

A new technique has been developed for testing the operation of a microwave detector of the sort used in dual technology sensors. This technique involves reducing the frequency of the pulses output to the microwave transmission antenna. The absence of power pulses at the expected times should be detectable in the output signal of the microwave section. If no difference in the detected signal is seen between the times when a power pulse is transmitted and the times when a power pulse is omitted then there is a malfunction in the microwave section. It is preferable that the microwave supervision should be performed frequently so as to ensure that any malfunction is promptly detected.

In certain designs of dual technology detector, where the microwave and infrared sections are sufficiently close together, it has been found that this test of the microwave sensor affects the output of the passive infrared sensor. In particular, during the time period when the pulse frequency of the microwave section is reduced the signal output by the infrared sensor alters. In some cases the size of the perturbation causes the PIR output to exceed the threshold level at which an alarm condition is considered to exist.

It would be possible to ignore the PIR output at times when the microwave test is taking place. However, the output of the PIR does not recover immediately the pulse frequency output by the microwave section has been restored to its usual value. In fact, the effect on the PIR is of such a duration that should the microwave test be performed as often as desired then the PIR would be affected by, or recovering from, the microwave test for about half of the time.

It is believed that the microwave test affects the PIR because during the test there is a reduction in the average power output by the microwave section. Some of the power radiated by the microwave section is inadvertently absorbed by the PIR. The amount of energy absorbed obviously depends upon how close together the microwave and infrared sections are. In normal operation this inadvertent absorption of power will take place continuously.

The effect of the absorbed power on the components of the PIR will stabilise with time. It is usual to run a dual technology sensor before use for a short warm-up period. The usual warm-up period is long enough for the PIR components to stabilise under the influence of the inadvertently-absorbed power from the microwave section. However, if the average power output by the microwave section varies then the magnitude of the absorbed power will vary also. The PIR components react to the reduction in average power and react to the subsequent restoration of the normal operating power level. A recovery period is needed before the PIR components stabilise back at the initial setting.

It has been found that the magnitude of the perturbation of the PIR output varies depending upon such factors as the construction of the printed circuit board on which the components are mounted and the geometry of the components on the board. These differences are believed to stem from the different paths by which energy is transmitted from the microwave section to the PIR. Some energy appears to pass along the circuit board from the microwave components to the PIR. Some energy appears to pass through the air to the PIR in the radiation transmitted by the microwave antennas.

Various methods have been found for counteracting the effect that the microwave test technique has on the PIR. However, it has also been realised that the effect can be used to test the operation of the PIR.

It is an object of the present invention in a first aspect to provide a method for testing the operation of the microwave section of a microwave/passive infrared dual technology sensor.

It is a further object of the present invention in the first aspect to provide a dual technology sensor including means for testing the operation of the microwave section thereof.

According to the first aspect of the invention there is provided apparatus for detecting movement in a space, the apparatus comprising:

a source of pulsed microwave energy having an output;

transmitting means in communication with the output of the source and for transmitting pulsed microwave energy into said space;

receiving means for receiving microwave energy from said space and outputting a signal indicative of the received energy;

a mixer for comparing the output of the source with the output of the receiving means and producing an output indicative of the result;

means for sampling the output of the mixer and for outputting a signal indicative of the sampled mixer output; and control means responsive to the output of the sampling means;

wherein the apparatus is operable in a detection mode and a supervision mode, during detection mode operation the control means produces an alarm indication when the output from the sampling means indicates movement within the monitored space, during supervision mode operation the sampling means samples the output of the mixer at first times and second times, the first times corresponding to microwave pulses and the second times corresponding to the absence of microwave pulses, and the control means produces a fault indication if there is no significant change in the output of the sampling means at said second times as compared with said first times.

According to the first aspect of the invention there is further provided dual technology detection apparatus, comprising:

a microwave section including:

a source of pulsed microwave energy having an output, transmitting means in communication with the output of the source and for transmitting pulsed microwave energy into said space, receiving means for receiving microwave energy from said space and outputting a signal indicative of the received energy, a mixer for comparing the output of the source with the output of the receiving means and producing an output indicative of the result, and means for sampling the output of the mixer and for outputting a signal indicative of the sampled mixer output;

an infrared section including means for sensing infrared radiation received from the space and outputting a signal indicative of the received radiation; and control means responsive to the output of the sampling means and the output of the infrared sensing means;

wherein the apparatus is operable in a microwave supervision mode and during microwave supervision mode operation the sampling means samples the output of the mixer at first times and second times, the first times corresponding to microwave pulses and the second times corresponding to the absence of microwave pulses, and the control means produces a fault indication if there is no significant change in the output of the sampling means at said second times as compared with said first times.

According to the first aspect of the invention there is yet further provided a method for testing apparatus for detecting movement in a space, the apparatus comprising a source of pulsed microwave energy having an output, transmitting means in communication with the output of the source and for transmitting pulsed microwave energy into said space, receiving means for receiving microwave energy from said space and outputting a signal indicative of the received energy, a mixer for comparing the output of the source with the output of the receiving means and producing an output indicative of the result, means for sampling the output of the mixer and for outputting a signal indicative of the sampled mixer output, and control means responsive to the output of the sampling means; the method comprising the steps of:

altering the frequency of operation of at least one of the source of microwave pulses and the sampling means such that the sampling means samples the output of the mixer at first times and second times, the first times corresponding to microwave pulses and the second times corresponding to the absence of microwave pulses, and adapting the control means to produce a fault indication if there is no significant change in the output of the sampling means at said second times as compared with said first times.

According to the first aspect of the invention there is still further provided a method for testing a microwave section of dual technology detection apparatus comprising the microwave section and an infrared section, the microwave section of the dual technology detection apparatus comprising a source of pulsed microwave energy having an output, transmitting means in communication with the output of the source and for transmitting pulsed microwave energy into said space, receiving means for receiving microwave energy from said space and outputting a signal indicative of the received energy, a mixer for comparing the output of the source with the output of the receiving means and producing an output indicative of the result, and means for sampling the output of the mixer and for outputting a signal indicative of the sampled mixer output; the infrared section of the dual technology detection apparatus including means for sensing infrared radiation received from the space and outputting a signal indicative of the received radiation; and the dual technology detection apparatus further comprising control means responsive to the output of the sampling means and the output of the infrared sensing means; the method comprising the steps of:

altering the frequency of operation of at least one of the microwave source and the sampling means such that the sampling means samples the output of the mixer at first times and second times, the first times corresponding to microwave pulses of the pulsed microwave energy and the second times corresponding to the absence of microwave pulses, and adapting the control means to produce a fault indication if there is no significant change in the output of the sampling means at said second times as compared with said first times.

According to the first aspect of the invention preferred embodiments of dual technology sensor have the advantage that the microwave test is adapted not to disturb the operation of the infrared section or that the sensor is adapted to prevent the effects of the microwave test from affecting the infrared section.

It is an object of the invention in a second aspect to provide a method for testing the operation of the infrared section of a microwave/infrared dual technology sensor.

It is a further object of the present invention in the second aspect to provide a dual technology sensor incorporating means for testing the operation of the infrared section.

According to the second aspect of the invention there is provided dual technology detection apparatus, comprising:

a microwave section including:

a source of pulsed microwave energy having an output, transmitting means in communication with the output of the source and for transmitting pulsed microwave energy into said space, receiving means for receiving microwave energy from said space and outputting a signal indicative of the received energy, a mixer for comparing the output of the source with the output of the receiving means and producing an output indicative of the result, and means for sampling the output of the mixer and for outputting a signal indicative of the sampled mixer output;

an infrared section including means for sensing infrared radiation received from the space and outputting a signal indicative of the received radiation; and control means responsive to the output of the sampling means and the output of the infrared sensing means;

wherein the apparatus is operable in an infrared supervision mode, the microwave source is adapted to alter the average energy output thereof during infrared supervision mode operation and the control means produces a fault indication if there is no significant change in the output of the infrared sensing means during infrared supervision mode operation as compared with non-infrared-supervision-mode operation.

According to the second aspect of the invention there is further provided a method for testing an infrared section of dual technology detection apparatus comprising a microwave section and the infrared section, the microwave section of the dual technology detection apparatus, comprising: a source of pulsed microwave energy having an output, transmitting means in communication with the output of the source and for transmitting pulsed microwave energy into said space, receiving means for receiving microwave energy from said space and outputting a signal indicative of the received energy, a mixer for comparing the output of the source with the output of the receiving means and producing an output indicative of the result, and means for sampling the output of the mixer and for outputting a signal indicative of the sampled mixer output; the infrared section of the dual technology detection apparatus including means for sensing infrared radiation received from the space and outputting a signal indicative of the received radiation, and the dual technology detection apparatus further comprising control means responsive to the output of the sampling means and the output of the infrared sensing means; the method comprising the steps of:

altering the average energy output by the microwave source and adapting the control means to produce a fault indication if the alteration in the average energy output by the microwave source does not result in a significant change in the output of the infrared sensing means.

In the most preferred embodiments of the invention both the first and second aspects are present, i.e. both the microwave and the infrared sections of the sensor are subjected to periodic tests.

BRIEF DESCRIPTION OF THE DRAWINGS

Further features and advantages of the present invention will become clear from the following description of embodiments thereof, given by way of example, and illustrated by the accompanying drawings, in which.

DETAILED DESCRIPTION OF PREFERRED EMBODIMENTS

Figure 1:
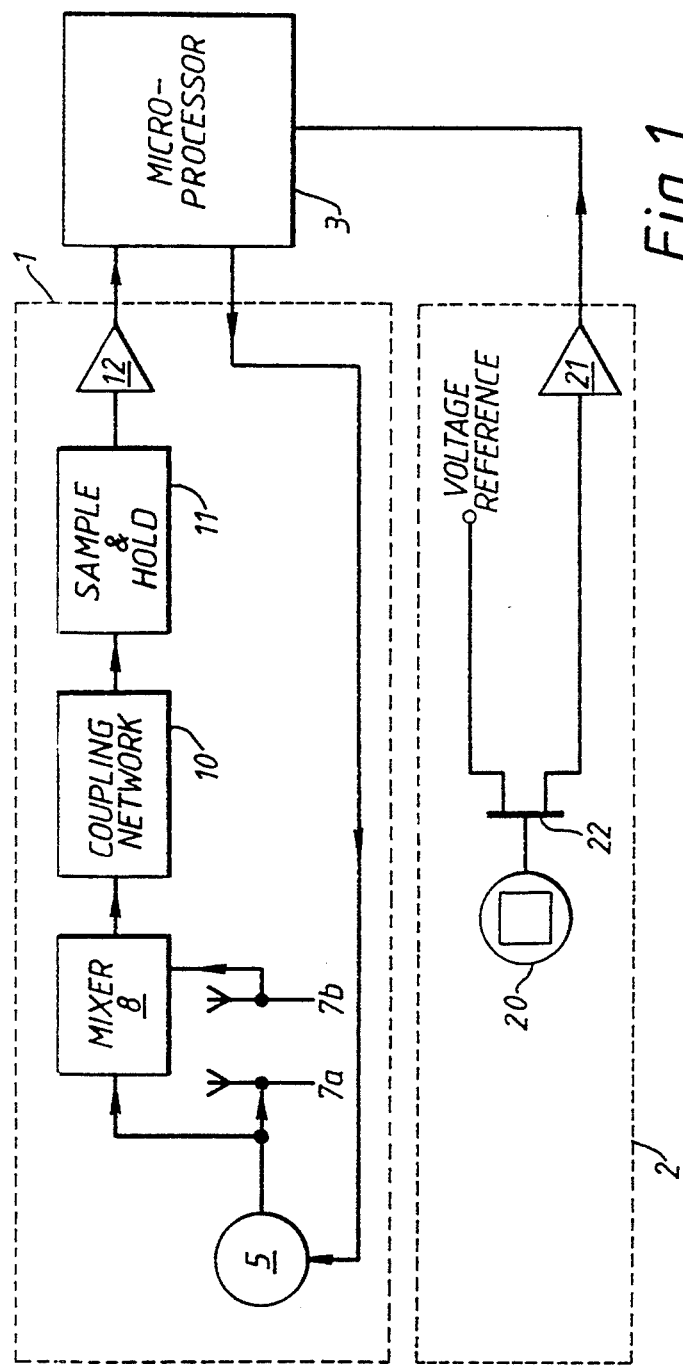
FIG. 1 shows a schematic diagram of the circuitry in a dual technology sensor according to a preferred embodiment of the invention.
Figure 2:
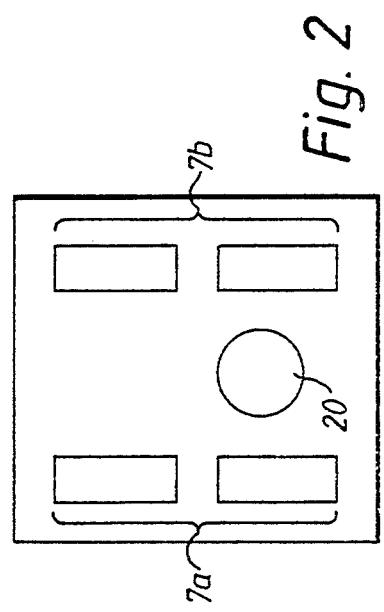
FIG. 2 shows a possible layout of microwave transmitting/receiving antennas and PIR in the dual technology sensor of FIG. 1.

A first embodiment of dual technology sensor according to the present invention is illustrated schematically in FIGS. 1 and 2. FIG. 1 shows the circuit components of this embodiment and FIG. 2 indicates a preferred layout of sensing elements in this embodiment.

In the dual technology detector of FIGS. 1 and 2, a microwave section 1 and infrared section 2 are controlled by a microprocessor 3. An FET-based oscillator 5 operates in a pulsed mode under the control of microprocessor 3 via a switching transistor (not shown). The oscillator 5 feeds a microwave transmitting antenna 7a. The frequency of the oscillator is typically 10.5 GHz. Each pulse of microwave energy fed to the microwave transmitting antenna 7a will contain a large number of cycles of the 10.5 GHz signal. The microwave transmitting antenna 7a is arranged to transmit radiation into the space to be monitored. A microwave receiving antenna 7b receives microwave energy from that space and outputs a signal to one input of a mixer 8. The second input to the mixer is coupled to receive a fraction of the energy from the oscillator 5.

The output from the mixer 8 is fed via a coupling network 10 to a sample and hold circuit 11. Conventionally the circuitry is arranged so that there will be no dc offset at the output of the mixer 8 and the coupling network may consist of a smoothing capacitor. According to the present invention, the coupling network is adapted to produce a small d.c. offset at the input of the sample and hold circuit 11 even when there is no movement occurring in the space being monitored. The microwave test according to the invention makes use of this offset. A coupling network according to the invention may use a resistor connected in parallel with a smoothing capacitor.

During normal operation of the microwave section, the sample and hold circuit 11 is synchronised to monitor the mixer output at moments when a pulse of microwave energy occurs. An ac-coupled amplifier 12 receives and amplifies the sampled signal before feeding it to the microprocessor 3 (which incorporates an analog-to-digital convertor).

When the microwave pattern in the space being monitored changes, for example because of the movement of a person in that space, a signal will be output by the amplifier 12. If the magnitude of the signal generated by the amplifier exceeds a threshold level then the microprocessor 3 deems that the microwave section has detected an alarm condition.

The infrared section consists of a passive infrared sensor (PIR) 20 feeding an amplifier 21 via a FET 22. As is conventional, the PIR 20 consists of a window 24 behind which are provided a pair of balanced infrared detecting elements (not shown) connected in opposition. The output from the amplifier 21 is transferred to the microprocessor 3. When the signal output from the amplifier 21 exceeds a threshold level then the microprocessor 3 deems that the infrared section has detected an alarm condition. When the signals from the microwave and infrared sections both indicate an alarm condition then the microprocessor 3 outputs an alarm signal.

The microwave transmitting antenna 7a, microwave receiving antenna 7b and infrared sensor 20 may be laid out on a circuit board 30 generally as shown in FIG. 2.

According to a preferred embodiment of the present invention the microprocessor 3 controls the oscillator 5 so as to implement a test of the microwave and infrared sections of the dual technology sensor as described below. It is to be understood that alternative embodiments of the invention may be designed to implement tests just of the microwave section of the sensor.

Figure 3A:
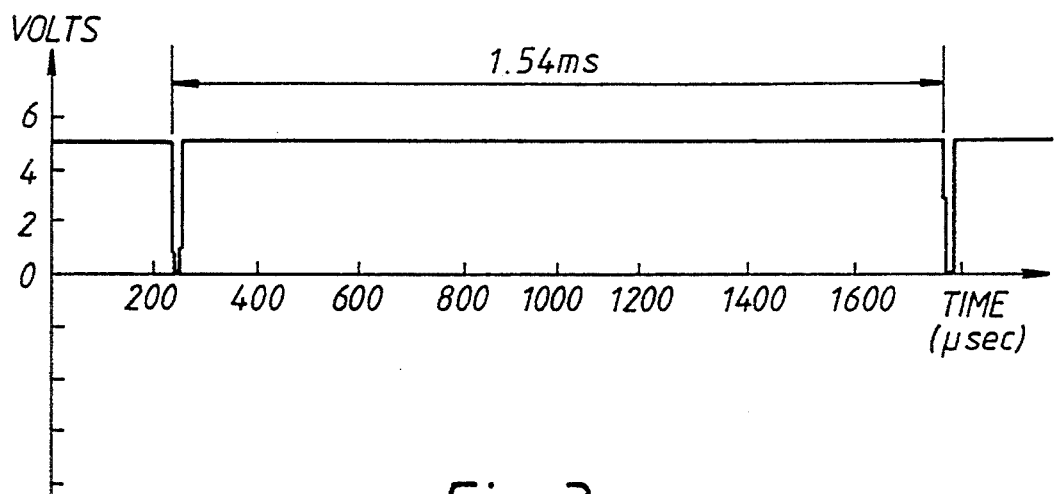
FIG. 3 compares the current drive to the microwave oscillator of FIG. 1 in normal mode (FIGS. 3a) and 3b)) with that during a test of the microwave section (FIG. 3c))
Figure 3B:
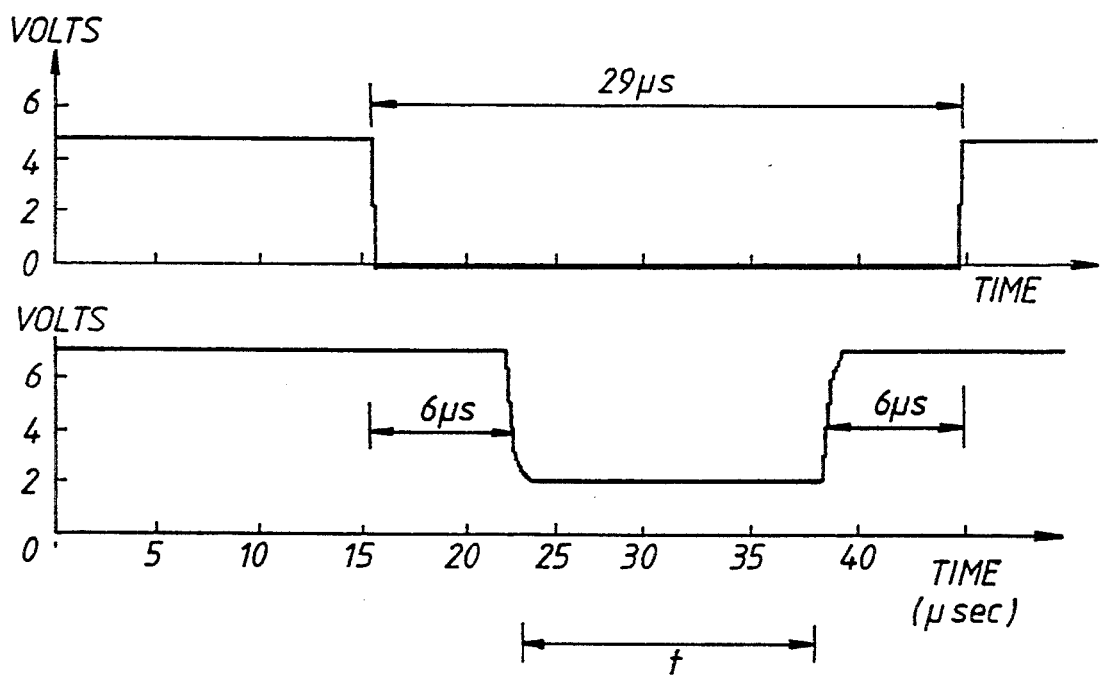

During normal operation of the microwave section the oscillator 5 is controlled using a current drive following the pattern shown in FIG. 3a). Each pulse in the current drive permits a burst of microwave oscillations to pass from the oscillator 5 to the transmitting antenna 7a and mixer 8. The sample and hold circuit 11 is adapted to sample the output of mixer 8 at times corresponding to the central portion (marked t on FIG. 3b)) of the pulses in the current drive to the microwave section. This avoids problems caused by distortion at the leading and trailing edges of the current drive pulse.

Figure 3C:
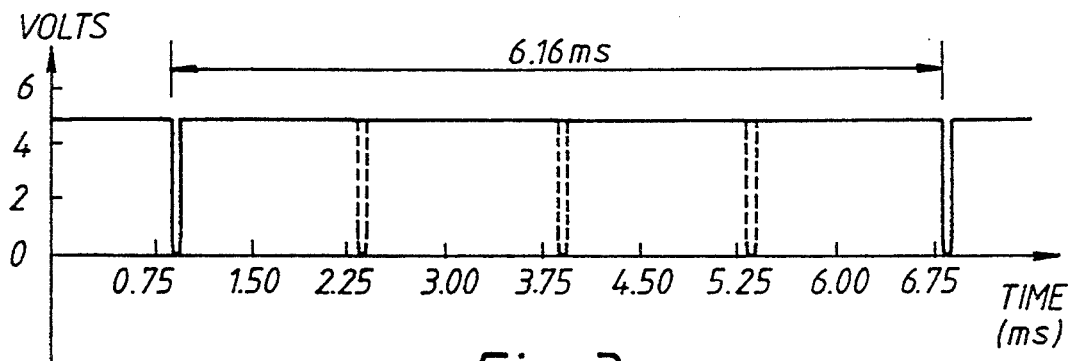

In order to test the microwave section the microprocessor 3 is programmed to alter the current drive to the oscillator 5 for a short period of time every so often. In the example illustrated in the drawings the microwave section is put into supervision mode for around 530 milliseconds every 11 seconds or so. As indicated in FIG. 3c), this alteration involves a quartering of the rate of current drive pulses. The sample and hold circuit 11 is also controlled to reduce the frequency at which it samples the mixer output. However, the latter change is arranged to halve the sampling frequency of the sample and hold circuit so that it will alternately sample the mixer output at times corresponding to a microwave pulse (i.e. a burst of oscillations) and at times when an expected microwave pulse is missing. This results in a 166 Hz oscillating waveform being output by the sample and hold circuit. This signal is amplified by the amplifier 12 and sensed by the microprocessor 3.

It is to be understood that the efficacy of the microwave test described above does not depend upon the microwave pulse frequency being reduced exactly by a factor of four. In the above example if the frequency of the microwave current drive had been halved, leaving the frequency of the sample and hold circuit unaltered, then the signal fed to the amplifier 12 would have had a frequency of 300 Hz. In this particular example the amplifier response is such that at 300 Hz the amplifier is operating in a non-linear portion of its characteristic. Thus it is preferable to arrange the microwave test so that the expected output of the sample and hold circuit during the test will be at a frequency where the amplifier is behaving in a linear fashion.

Any appropriate change in the oscillator drive frequency and/or the sampling rate of the sample and hold circuit which leads to the mixer output being sampled at times corresponding to a microwave pulse and at times corresponding to an expected, but omitted, pulse will enable a difference to be detected if the microwave section is operating properly.

Because of the dc offset induced by the coupling network 10 the signal detected by the sample and hold network at times corresponding to a microwave pulse will differ from that detected when an expected microwave pulse is missing. Thus, during the microwave test, the output of the sample and hold circuit will be a signal of small amplitude. This signal is amplified by the ac-coupled amplifier 12 and output to the microprocessor 3. During the microwave test the microprocessor 3 is programmed to expect a signal of small, but detectable, amplitude if the microwave section is functioning normally. If no such signal is detected then the microwave section is deemed to be faulty and a fault signal is produced.

Figure 4:
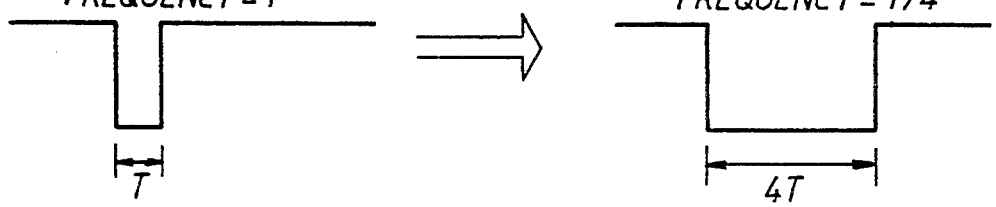
FIG. 4 illustrates the current drive to the microwave oscillator in a modified test adapted to prevent disturbance of the infrared section.

If the microwave test were to be performed exactly as described above then there would be an effect on the output of the PIR. As explained above, the microwave test affects the PIR output because of the change in the average power output by the microwave section during the test. This effect can be avoided by modifying the microwave test such that although the frequency of microwave pulses is reduced the average output energy is maintained. This is achieved by increasing the duration and/or magnitude of each current drive pulse during the test. This is illustrated in FIG. 4.

There are alternative techniques available for reducing or eliminating the effect of the microwave test upon the PIR. It has been found that the magnitude of the effect on the PIR is reduced if holes are provided in the circuit board on which the microwave components and the PIR are mounted. Presumably this reduces the conduction of energy along the circuit board from the microwave section to the infrared section. Furthermore, the effect upon the PIR may be reduced by providing microwave absorbing material around the periphery of the PIR. Finally, the geometry of the microwave transmitting and receiving antennas relative to the PIR may be changed so as to increase the distance between the microwave and infrared sections. However, this latter technique has the disadvantage of making the overall bulk of the sensor larger.

Figure 5:
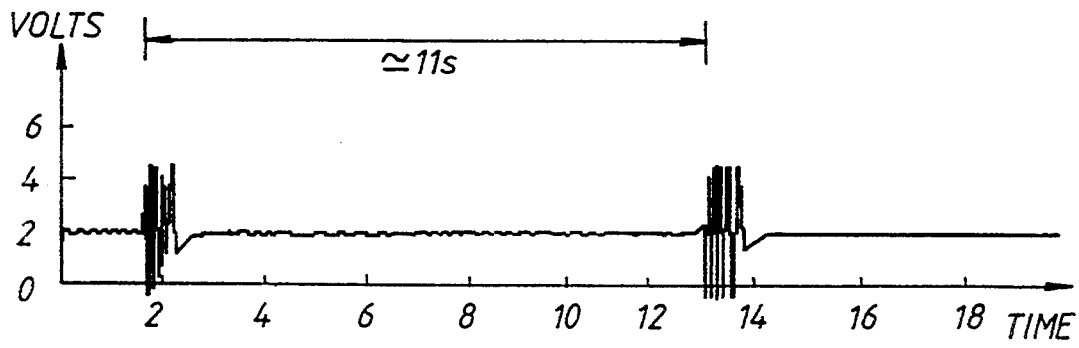
FIG. 5 illustrates how the output of the microwave section of FIG. 1 changes during a test thereof.
Figure 6:
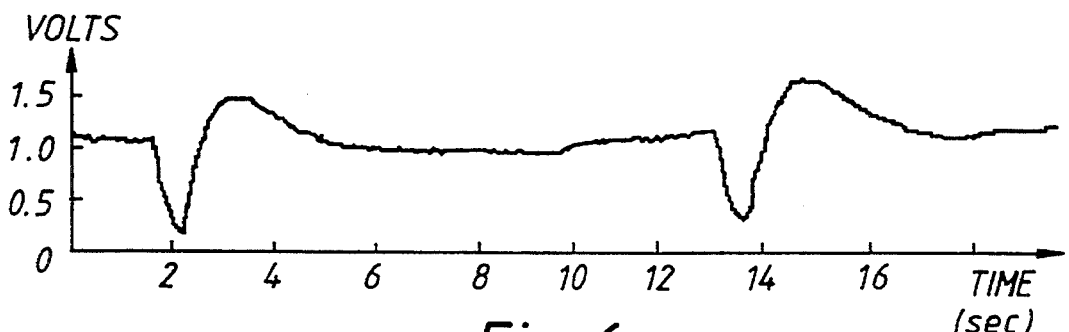
FIG. 6 shows how the output of the infrared section changes during the test illustrated by the waveform of FIG. 5.

It has been realised that there are circumstances under which the effect of the microwave test upon the infrared section can be used positively. In particular, the operation of the infrared section may be tested by changing the amount of energy output from the microwave section and monitoring the output of the infrared section. If the basic microwave supervision process described above is performed (involving a change in the average output microwave power) then the microprocessor 3 receives a signal from the microwave section as shown in FIG. 5. If no measures are taken to shield the infrared section from the effects of the test then the output from the infrared section will take the form shown in FIG. 6, assuming that the infrared section is operating properly. If there is no change in the output of the infrared section then there is a malfunction in that section. This is a convenient test of the infrared section.

The above-described test of the infrared section may be designed merely to make use of the power that is inadvertently absorbed by the PIR. Alternatively, energy from the microwave section may be specially channelled to the infrared sensor while at the same time the PIR is shielded from the usual inadvertent absorption of microwave energy. During normal operation of the dual technology sensor a switch would be open to prevent energy passing from the microwave section to the infrared section. However, during testing of the infrared section the switch would be closed to allow the energy to be coupled to the PIR along the specially provided channel.

While the microwave supervision technique is being used to test the operation of the infrared section the output of the infrared section will be high over an extended period of time. As mentioned earlier, the amplitude of this effect can exceed the level needed to cause an alarm. This makes it favourable to increase the time period between successive tests of the infrared section so that it is "out of operation" for a smaller percentage of the time. However an alternative is possible. When a source of infrared radiation moves within the monitored space then the output of the infrared section is high for a relatively short period of time. By suitable programming of the microprocessor 3 it is possible for an alarm condition to be distinguished from the effects of the test on the basis of their time and/or amplitude characteristics.

The above-described test of the infrared section additionally tests the operation of the microwave transmitting antenna 7a.

Furthermore, it is envisaged that the microwave test according to the invention could be applied in a "single technology" detector which uses microwaves for intruder detection or the like.

I claim:

1. A method for testing apparatus for detecting movement in a space, said apparatus including a source of pulsed microwave energy having an output, transmitting means in communication with said source output for transmitting pulsed microwave energy into said space, receiving means for receiving microwave energy from said space and outputting an energy received signal corresponding with the received energy, a mixer for comparing the output of the source with the output of the receiving means and producing a mixer signal corresponding with the result, means for sampling the output of the mixer and for outputting a sampling signal indicative of the sampled mixer output, and control means responsive to the output of the sampling means; said method comprising the steps of:

(a) altering the frequency of operation of at least one of said source of microwave pulses and said sampling means such that said sampling means samples the output of said mixer means at first and second times, the first times corresponding to the presence of microwave pulses and the second times corresponding to the absence of microwave pulses, and (b) operating said control means to produce a fault indication in the absence of significant change in the output of the sampling means at said second times as compared with said first times.

2. A method for testing the microwave section of dual technology detection apparatus having a microwave section and an infrared section, said microwave section including a source of pulsed microwave energy having an energy output, transmitting means in communication with said source output for transmitting pulsed microwave energy into a monitored space, receiving means for receiving microwave energy from said space and outputting a received energy signal corresponding with the received energy, mixer means for comparing said source output signal with said energy received signal and producing an output indicative of the result, and means for sampling the output of said mixer means and for outputting a sampling signal indicative of the sampled mixer output; the infrared section of said dual technology detection apparatus including means for sensing infrared radiation received from the space and outputting an infrared energy received signal indicative of the received radiation, and the dual technology detection apparatus further including control means responsive to the output of said sampling means and the output of said infrared sensing means; the method comprising the steps of:

(a) altering the frequency of operation of at least one of said microwave source and said sampling means such that said sampling means samples the output of said mixer means at first and second times, said first times corresponding to the presence of microwave pulses and the second times corresponding to the absence of microwave pulses, and (b) operating said control means to produce a fault indication if there is no significant change in the output of said sampling means at said second times as compared with said first times.

3. Dual technology detection apparatus, comprising:
a microwave section including:
a source of pulsed microwave energy having an output,
transmitting means in communication with the output of the source and for transmitting pulsed microwave energy into said space,
receiving means for receiving microwave energy from said space and outputting a signal indicative of the received energy,
a mixer for comparing the output of the source with the output of the receiving means and producing an output indicative of the result, and
means for sampling the output of the mixer and for outputting a signal indicative of the sampled mixer output;
an infrared section including means for sensing infrared radiation received from the space and outputting a signal indicative of the received radiation; and
control means responsive to the output of the sampling means and the output of the infrared sensing means;
wherein the apparatus is operable in an infrared supervision mode, the microwave source is adapted to alter the average energy output thereof during infrared supervision mode operation and the control means produces a fault indication if there is no significant change in the output of the infrared sensing means during infrared supervision mode operation as compared with non-infrared-supervision-mode operation.

4. A method for testing an infrared section of dual technology detection apparatus comprising a microwave section and the infrared section, the microwave section of the dual technology detection apparatus, comprising: a source of pulsed microwave energy having an output, transmitting means in communication with the output of the source and for transmitting pulsed microwave energy into said space, receiving means for receiving microwave energy from said space and outputting a signal indicative of the received energy, a mixer for comparing the output of the source with the output of the receiving means and producing an output indicative of the result, and means for sampling the output of the mixer and for outputting a signal indicative of the sampled mixer output; the infrared section of the dual technology detection apparatus including means for sensing infrared radiation received from the space and outputting a signal indicative of the received radiation, and the dual technology detection apparatus further comprising control means responsive to the output of the sampling means and the output of the infrared sensing means; the method comprising the steps of:

altering the average energy output by the microwave source and adapting the control means to produce a fault indication if the alteration in the average energy output by the microwave source does not result in a significant change in the output of the infrared sensing means.

5. Apparatus for detecting movement in a monitored space comprising:

(a) a source (5) of pulsed microwave energy having an energy source output;

(b) transmitting means (7a) in communication with said energy source output for transmitting pulsed microwave energy into said monitored space;

(c) receiving means (7b) for receiving microwave energy from said monitored space and for outputting an energy-received signal corresponding with the received energy;

(d) mixer means (8) for comparing said energy source output with said energy received signal to produce a mixer signal;

(e) means (11) for sampling said mixer signal at a first frequency to produce a sampling signal indicative of the sampled mixer output; and (f) control means (3) responsive to said sampling signal, said control means being alternately operable in detection and in supervisory modes, respectively, (1) said control means being operable in said detection mode to produce an alarm signal when said energy received and sampling signals indicate movement within said monitored space;

(2) said sampling means being operable when said control means is in said supervisory mode to sample said mixer signal at a reduced frequency at first times corresponding with the presence of said energy source signals and at second times corresponding with the absence of said energy source signals;

(3) said control means being operable during said supervisory mode to produce a fault indication in the absence of any significant change in said sampling signal at said second times as compared with said first times.

6. A method for testing apparatus for detecting movement in a space, said apparatus including a source of pulsed microwave energy having an output, transmitting means in communication with said source output for transmitting pulsed microwave energy into said space, receiving means for receiving microwave energy from said space and outputting an energy received signal corresponding with the received energy, mixer means for comparing said source output with the output of the receiving means and producing a mixer signal corresponding with the result, means for sampling the output of mixer means and for outputting a sampling signal indicative of the sampled mixer output, and control means responsive to the output of the sampling means; the method comprising the steps of:

(a) reducing the frequency of operation of said source of microwave pulses such that the sampling means samples the output of the mixer at first and second times, the first times corresponding to the presence of microwave pulses and the second times corresponding to the absence of microwave pulses, and (b) operating said control means to produce a fault indication if there is no significant change in the output of the sampling means at said second times as compared with said first times.

7. Dual technology detection apparatus for detecting movement in a space comprising:

(a) a microwave section including:

(1) a source of pulsed microwave energy having an energy output signal, (2) transmitting means in communication with said energy source and for transmitting pulsed microwave energy into said space, (3) receiving means for receiving microwave energy from said space and outputting an energy received signal indicative of the received energy, (4) mixer means for comparing said energy output signal and said energy received signal to produce a mixer signal, and (5) means for sampling the mixer signal and for outputting a mixer signal indicative of the sampled mixer output;

(b) an infrared section including means for sensing infrared radiation received from said outputting signal indicative of the received radiation; and (c) control means responsive to said sampling signal and said infrared signal, said control means being alternately operable between detection and supervisory modes, (1) said sampling means being operable during said supervisory mode to sample said mixer signal at first times corresponding with the presence of said energy output signal and at second times corresponding with the absence of said energy output signal;

(2) said control means being operable to produce a fault indication if there is no significant change in said sampling signal at said second times as compared with said first times;

(3) said source being operable at a first frequency during said detection mode, and at a reduced frequency during said supervisory mode, said source being operable to effect a compensatory increase in at least one of the duration and amplitude of said microwave energy pulses so as to maintain the microwave power output of said source substantially unchanged.

8. Dual technology detection apparatus for detecting movement in a space comprising:

(a) a microwave section including:

(1) a source of pulsed microwave energy having an energy output, (2) transmitting means in communication with said energy source and for transmitting pulsed microwave energy into said space, (3) receiving means for receiving microwave energy from said space and outputting an energy received signal indicative of the received energy, (4) mixer means for comparing said energy output signal and said energy received signal to produce a mixer signal, and (5) means for sampling the mixer signal and for outputting a mixer signal indicative of the sampled mixer output;

(b) an infrared section including means for sensing infrared radiation received from said space and outputting an infrared signal indicative of the received radiation; and (c) control means responsive to said sampling signal and said infrared signal, said control means being alternately operable between detection and supervisory modes,
  (1) said sampling means being operable during said supervisory mode to sample said mixer signal at first times corresponding with the presence of said source energy output and at second times corresponding with the absence of said source energy output;
  (2) said control means being operable to produce a fault indication if there is no significant change in said sampling signal at said second times as compared with said first times;
(d) said apparatus being also operable in an infrared supervisory mode, said source of microwave energy being altered and said control means being operable during said infrared supervisory mode to produce a fault indication if the alteration in the average microwave energy output fails to produce a predetermined change in the output of said infrared sensing means.

9. A method for testing the microwave section of dual technology detection apparatus having a microwave section and an infrared section, said microwave section including a source of pulsed microwave energy having an energy output, transmitting means in communication with said source output for transmitting pulsed microwave energy into a monitored space, receiving means for receiving microwave energy from said space and outputting a received energy signal corresponding with the received energy, mixer means for comparing said source output with said energy received signal and producing a mixer output signal indicative of the result, and means for sampling the signal mixer and for outputting a sampling signal indicative of the sampled mixer output; the infrared section of said dual technology detection apparatus including means for sensing infrared radiation received from the space and outputting an infrared energy received signal indicative of the received radiation, and the dual technology detection apparatus further including control means responsive to the output of said sampling means and the output of said infrared sensing means; the method comprising the steps of:
  (a) reducing the frequency of operation of at least one of said microwave source and said sampling means such that said sampling means samples the output of said mixer means at first and second times, said first times corresponding to the presence of microwave pulses and the second times corresponding to the absence of microwave pulses;
  (b) operating said control means to produce a fault indication if there is no significant change in the output of the sampling means at said second times as compared with said first times; and
  (c) effecting a compensatory increase in at least one of the amplitude and duration of said microwave pulses so as to maintain the average microwave power output of said source substantially unchanged.

10. Apparatus for detecting movement in a monitored space, comprising:
  (a) a source (5) of pulsed microwave energy having an energy source output;
  (b) transmitting means (7a) in communication with said energy source output for transmitting pulsed microwave energy into said monitored space;
  (c) receiving means (7b) for receiving microwave energy from said monitored space and for outputting an energy-received signal corresponding with the received energy;
  (d) mixer means (8) for comparing said energy source output with said energy received signal to produce a mixer signal;
  (e) means (11) for sampling said mixer signal to produce a sampling signal indicative of the sampled mixer output;
  (f) control means (3) responsive to said sampling signal, said control means being alternately operable in detection and in supervisory modes, respectively,
    (1) said control means being operable in said detection mode to produce an alarm signal when said energy received and sampling signals indicate movement within said monitored space;
    (2) said sampling means being operable when said control means is in said supervisory mode to sample said mixer signal at first times corresponding with the presence of said energy source signals and at second times corresponding with the absence of said energy source signals;
    (3) said control means being operable during said supervisory mode to produce a fault indication in the absence of any significant change in said sampling signal at said second times as compared with said first times; and
  (g) a coupling circuit connected between said mixer means and said sampling means, said coupling circuit having an output, said coupling circuit being adapted to ensure that there is a dc offset at said coupling circuit output even in the absence of movement in said space.

11. Dual technology detection apparatus for detecting movement in a monitored space, comprising:
  (a) a microwave section including:
    (1) a source of pulsed microwave energy having an energy output,
    (2) transmitting means in communication with said energy source output and for transmitting pulsed microwave energy into said space,
    (3) receiving means for receiving microwave energy from said space and outputting an energy received signal indicative of the received energy,
    (4) mixer means for comparing said energy output signal and said energy received signal to produce a mixer signal, and
    (5) means for sampling the mixer signal and for outputting a sampling signal indicative of the sampled mixer output;
  (b) an infrared section including means for sensing infrared radiation received from said space and outputting an infrared signal indicative of the received radiation;
  (c) control means responsive to said sampling signal and said infrared signal, said control means being alternately operable between detection and supervisory modes,
    (1) said sampling means being operable during said supervisory mode to sample said mixer signal at first times corresponding with the presence of said energy output signal and at second times corresponding with the absence of said energy output signal;
    (2) said control means being operable to produce a fault indication if there is no significant change in said sampling signal at said second times as compared with said first times; and (d) a circuit board, said microwave source and said infrared sensor being mounted on said circuit board, said circuit board containing a plurality of holes for inhibiting the conduction of microwave energy from said source to said infrared sensing means.

12. Dual technology detection apparatus for detecting movement in a monitored space, comprising:
(a) a microwave section including:
(1) a source of pulsed microwave energy having an energy output,
(2) transmitting means in communication with said energy source output and for transmitting pulsed microwave energy into said space,
(3) receiving means for receiving microwave energy from said space and outputting an energy received signal indicative of the received energy,
(4) mixer means for comparing said energy output signal and said energy received signal to produce a mixer signal, and
(5) means for sampling the mixer signal and for outputting a sampling signal indicative of the sampled mixer output;
(b) an infrared section including means for sensing infrared radiation received from said space and outputting an infrared signal indicative of the received radiation;
(c) control means responsive to said sampling signal and said infrared signal, said control means being alternately operable between detection and supervisory modes,
(1) said sampling means being operable during said supervisory mode to sample said mixer signal at first times corresponding with the presence of said energy output signal and at second times corresponding with the absence of said energy output signal;
(2) said control means being operable to produce a fault indication if there is no significant change in said sampling signal at said second times as compared with said first times; and
(d) means including microwave absorbing material arranged to shield said infrared sensing means from said microwave energy source.

13. Dual technology detection apparatus for detecting movement in a space comprising:

(a) a microwave section including:
(1) a source of pulsed microwave energy having an energy output,
(2) transmitting means in communication with said energy source and for transmitting pulsed microwave energy into said space,
(3) receiving means for receiving microwave energy from said space and outputting an energy received signal indicative of the received energy,
(4) mixer means for comparing said energy output signal and said energy received signal to produce a mixer signal, and
(5) means for sampling the mixer signal and for outputting a mixer signal indicative of the sampled mixer output;
(b) an infrared section including means for said sensing infrared radiation received from said space and outputting an infrared signal indicative of the received radiation;
(c) control means responsive to said sampling signal and said infrared signal, said control means being alternately operable between detection and supervisory modes,
(1) said sampling means being operable during said supervisory mode to sample said mixer signal at first times corresponding with the presence of said source energy output and at second times corresponding with the absence of said source energy output;
(2) said control means being operable to produce a fault indication if there is no significant change in said sampling signal at said second times as compared with said first times;
(d) said apparatus being also operable in an infrared supervisory mode, said source of microwave energy being altered during said infrared supervisory mode and said control means being operable to produce a fault indication if the alteration in the average microwave energy output does not result in a predetermined change in the output of said infrared sensing means; and
(e) means defining a switchable path between said microwave source output and said infrared sensing means, whereby during said infrared supervisory mode operation, said switchable path is conditioned to permit microwave energy to pass from said microwave source to said infrared sensing means.

* * * * *